(12) United States Patent
Du et al.

(10) Patent No.: US 9,369,563 B2
(45) Date of Patent: Jun. 14, 2016

(54) INTELLIGENT TERMINAL WITH ELECTRONIC INK DISPLAY DEVICE

(71) Applicant: HUIZHOU TCL MOBILE COMMUNICATION CO., LTD, HuiZhou, Guangdong (CN)

(72) Inventors: Jiamei Du, HuiZhou (CN); Cheol Woo Park, HuiZhou (CN); Hongxia Leng, HuiZhou (CN); Jinai Lin, HuiZhou (CN); Wei Yang, HuiZhou (CN)

(73) Assignee: HUIZHOU TCL MOBILE COMMUNICATION CO., LTD, Guangdong (CN)

( * ) Notice: Subject to any disclaimer, the term of this patent is extended or adjusted under 35 U.S.C. 154(b) by 0 days.

(21) Appl. No.: 14/421,843

(22) PCT Filed: Apr. 22, 2014

(86) PCT No.: PCT/CN2014/075924
§ 371 (c)(1),
(2) Date: Feb. 16, 2015

(87) PCT Pub. No.: WO2015/062222
PCT Pub. Date: May 7, 2015

(65) Prior Publication Data
US 2016/0028873 A1 Jan. 28, 2016

(30) Foreign Application Priority Data

Oct. 30, 2013 (CN) .......................... 2013 1 0522691

(51) Int. Cl.
*H04M 1/00* (2006.01)
*H04M 1/725* (2006.01)
(Continued)

(52) U.S. Cl.
CPC ....... *H04M 1/72527* (2013.01); *H01R 13/6205* (2013.01); *H04M 1/0266* (2013.01); *H04M 1/0279* (2013.01); *H04M 2250/16* (2013.01)

(58) Field of Classification Search
CPC ... G06F 1/16525; G06F 3/041; G06F 3/0412; G06F 3/044; G06F 3/0488; H04M 1/0268; H04M 2250/16; H04M 2250/22; H04M 1/0214; H04B 1/3888
USPC ........................................................ 455/557
See application file for complete search history.

(56) References Cited

U.S. PATENT DOCUMENTS 6,775,129 B1 * 8/2004 Ghosh ..................... G06F 1/162
361/679.09
2003/0001830 A1 1/2003 Wampler
(Continued)

FOREIGN PATENT DOCUMENTS

| CN | 201528369 | 7/2010 |
|----|-----------|--------|
| CN | 102298419 | 12/2011 |

(Continued)

*Primary Examiner* — Don N Vo
(74) *Attorney, Agent, or Firm* — Mark M. Friedman

(57) ABSTRACT

An intelligent terminal with an electronic ink display device is provided. The intelligent terminal includes a terminal body and a display protection cover. A side of the display protection cover is coupled to a side of the terminal body. A front of the display protection cover has an electronic ink display screen disposed thereon, and the electronic ink display screen performs data communication with the terminal body via a spring probe. In the present invention, the electronic ink display screen is disposed on the display protection cover, so that the function of the E-Ink display can be achieved on a user's own mobile phone or other mobile terminals.

17 Claims, 6 Drawing Sheets

(51) Int. Cl.
*H01R 13/62* (2006.01)
*H04M 1/02* (2006.01)

(56) References Cited

U.S. PATENT DOCUMENTS

| | | | | |
|---|---|---|---|---|
| 2010/0177036 A1* | 7/2010 | Nam | ................... | G06F 1/1616 345/156 |
| 2012/0242588 A1* | 9/2012 | Myers | ................... | G06F 1/1637 345/173 |
| 2013/0076649 A1* | 3/2013 | Myers | ................ | H04M 1/0268 345/173 |
| 2014/0014717 A1 | 1/2014 | Bremer | | |
| 2014/0132543 A1* | 5/2014 | Kim | ................... | G06F 1/1626 345/173 |

FOREIGN PATENT DOCUMENTS

| | | |
|---|---|---|
| CN | 103139340 | 6/2013 |
| CN | 103197736 | 7/2013 |
| CN | 103561143 | 2/2014 |

* cited by examiner

INTELLIGENT TERMINAL WITH ELECTRONIC INK DISPLAY DEVICE

TECHNICAL FIELD OF THE INVENTION

The present invention relates to an intelligent terminal technology, and in particular to an intelligent terminal with an electronic ink display device.

BACKGROUND OF THE INVENTION

Mobile phones and other intelligent terminals have become a part of young people's lives. The majority of young people use intelligent terminals to carry out a variety of activities such as reading news, novels, magazines, and so on. However, the user's long-term viewing of the mobile phone screen easily causes some drawbacks such as visual fatigue, vision decline, etc. In order to solve this problem, devices using E-ink screens (electronic ink display device) have arisen. The E-ink screen has the characteristics of legibility, flexibility, ease of manufacturing with low costs, low power consumption, and so on. In comparison with other display technologies, the electronic ink has a better reflectivity and contrast. It looks like ink on paper, and does not easily cause visual fatigue and vision decline. Meanwhile, in direct sunlight, it is easier to view text on display devices based on electronic ink in comparison with other display materials.

However, in the existing technology, the electronic ink display device still cannot be integrated into the intelligent terminal, so that users can only use their own electronic ink display device when using the intelligent terminal to read. This is inconvenient to use and carry for the users.

SUMMARY OF THE INVENTION

In view of the drawbacks of the prior art, an objective of the present invention is to provide an intelligent terminal with an electronic ink display device, which aims to solve the problem that a conventional electronic screen cannot be integrated on an intelligent terminal.

The technical solution of this invention is implemented as follows.

The present invention provides an intelligent terminal with an electronic ink display device, which includes:

a terminal body; and a display protection cover for protecting a display screen of the terminal body;

wherein a side of the display protection cover has a connecting portion which is movably coupled to a side of the terminal body, a front of the display protection cover has an electronic ink display screen disposed thereon, the electronic ink display screen performing data communication with the terminal body via a spring probe;

the connecting portion has a first magnet disposed thereon, and the terminal body is provided with a second magnet, and a position of the second magnet on the terminal body corresponds to a position of the first magnet on the connecting portion;

a side of the display protection cover separated from the terminal body has a third magnet, the terminal body is provided with a fourth magnet, and position of the fourth magnet on the terminal body corresponds to a position of the third magnet on the display protection cover.

In the intelligent terminal, with the electronic ink display device of the present invention, the side of the terminal body has a locating hole, and the connecting portion has a locating column disposed thereon for inserting into the locating hole.

In the intelligent terminal with the electronic ink display device of the present invention, the side of the terminal body has a plurality of locating holes disposed along the side of the terminal body.

In the intelligent terminal with the electronic ink display device of the present invention, the connecting portion further includes a support, a leather portion, a metal press plate, and a lid, the leather portion is coupled to the side of the display protection cover, the support is disposed on a bottom of the leather portion, the metal press plate is disposed on a top of the leather portion, the support, the leather portion, and the metal press plate are fixed by screws, the lid is disposed on a top of the metal press plate.

In the intelligent terminal with the electronic ink display device of the present invention, the lid is engaged with the metal press plate.

In the intelligent terminal with the electronic ink display device of the present invention, the lid is glued to the metal press plate.

In the intelligent terminal with the electronic ink display device of the present invention, the connecting portion is fixed on the side of the display protection cover by screws.

In the intelligent terminal with the electronic ink display device of the present invention, the electronic ink display screen is controlled by a volume button disposed on the side of the terminal body.

The present invention further provides an intelligent terminal with an electronic ink display device, which includes:

a terminal body; and a display protection cover for protecting a display screen of the terminal body;

wherein a side of the display protection cover is coupled to a side of the terminal body, a front of the display protection cover having an electronic ink display screen disposed thereon, the electronic ink display screen and the terminal body performing a data communication via a spring probe.

In the intelligent terminal with the electronic ink display device of the present invention, the side of the display protection cover has a connecting portion which is utilized to movably couple to the terminal body.

In the intelligent terminal with the electronic ink display device of the present invention, the connecting portion has a first magnet disposed thereon, and the terminal body is provided with a second magnet, and a position of the second magnet on the terminal body corresponds to a position of the first magnet on the connecting portion.

In the intelligent terminal with the electronic ink display device of the present invention, a side of the display protection cover separated from the terminal body has a third magnet, the terminal body is provided with a fourth magnet, and position of the fourth magnet on the terminal body corresponds to a position of the third magnet on the display protection cover.

In the intelligent terminal with the electronic ink display device of the present invention, the side of the terminal body has a locating hole, and the connecting portion has a locating column disposed thereon for inserting into the locating hole.

In the intelligent terminal with the electronic ink display device of the present invention, the side of the terminal body has a plurality of locating holes, the locating holes are disposed along the side of the terminal body.

In the intelligent terminal with the electronic ink display device of the present invention, the connecting portion further comprises a support, a leather portion, a metal press plate, and a lid, the leather portion is coupled to the side of the display protection cover, the support is disposed on a bottom of the leather portion, the metal press plate is disposed on a top of the leather portion, the support, the leather portion, and the metal press plate are fixed by screws, the lid is disposed on a top of the metal press plate.

In the intelligent terminal with the electronic ink display device of the present invention, the lid is engaged with the metal press plate.

In the intelligent terminal with the electronic ink display device of the present invention, the lid is glued to the metal press plate.

In the intelligent terminal with the electronic ink display device of the present invention, the connecting portion is fixed on the side of the display protection cover by screws.

In the intelligent terminal with the electronic ink display device of the present invention, the electronic ink display screen is controlled by a volume button disposed on the side of the terminal body.

The beneficial effects lie in: in the present invention, the electronic ink display screen is disposed on the display protection cover and uses the spring probe to perform the data communication, power supply and display with the terminal body, whereby the present invention realizes the function of the E-Ink display on the mobile terminal. The most important feature of the present invention is that it has a slim and compact size and is easy to carry, so that the capability of the E-Ink display on the mobile terminal can be achieved in the user's own mobile phone or other mobile terminals.

DETAILED DESCRIPTION OF THE INVENTION

The present invention provides an intelligent terminal with an electronic ink display device. Reference will now be made in detail to the invention, examples of which are illustrated in the accompanying drawings. It should be understood that the specific embodiment described herein is merely utilized to explain the present invention but not to limit the present invention.

Figure 1:
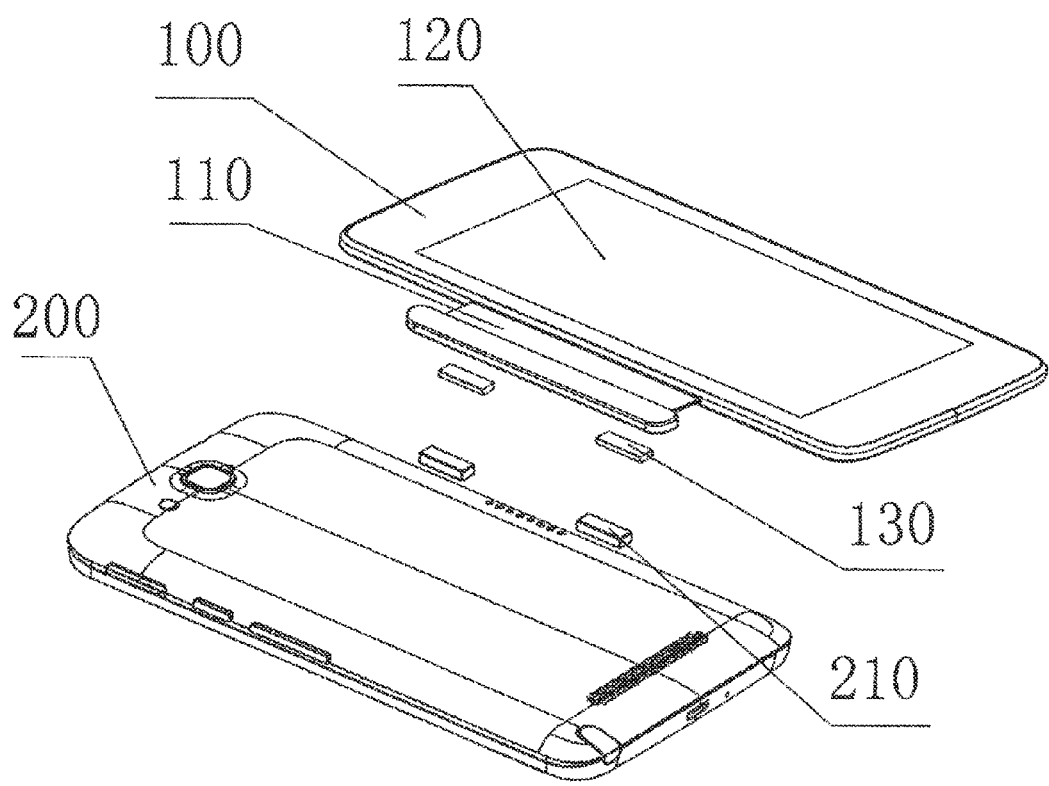
FIG. 1 is an exploded view illustrating an intelligent terminal with an electronic ink display device of one preferred embodiment.

Refer to FIG. 1, which is an exploded view illustrating an intelligent terminal with an electronic ink display device of one preferred embodiment. As shown in the drawing, the intelligent terminal includes a terminal body 200 and a display protection cover 100 for protecting a display screen of the terminal body 200. A side of the display protection cover 100 is coupled to a side of the terminal body 200. The display protection cover 100 can employ prior art devices such as a phone holster and so on. Improvement of the present invention is as follow. A front of the display protection cover 100 has an electronic ink display screen 120 disposed thereon, and the electronic ink display screen 120 performs data communication with the terminal body 200 via a spring probe. By disposing the electronic ink display screen 120, in using the mobile phone and other mobile terminals, users just dose the display protection cover 100 and carry out the reading action directly on the electronic ink display screen 120 disposed on the display protection cover 100. Thus, it is very convenient to use, no other extra devices are added, and only the common display protection cover is used. Moreover, since the electronic ink display screen 120 gives a very comfortable reading experience, bringing an excellent experience for the users.

Furthermore, the side of the display protection cover 100 has a connecting portion 110 which is movably coupled to the terminal body 200. The connecting portion 110 is utilized to couple the display protection cover 100 and the terminal body 200.

The connecting portion 110 in the present invention has a first magnet 130 disposed thereon. A second magnet 210 magnetically attracting the first magnet 130 is disposed at a position corresponding to the first magnet 130 on the terminal body 200. The first magnet 130 and the second magnet 210 make the connection between the connecting portion 110 and the terminal body 200 more convenient, enabling the connecting portion 110 and the terminal body 200 to position at the same time. There can be two first magnets 130 disposed along the side of the connecting portion 110 with a spacing, thereby achieving a better positioning and connection. Correspondingly, two second magnets 210 need to be disposed at the corresponding positions.

Figure 2:
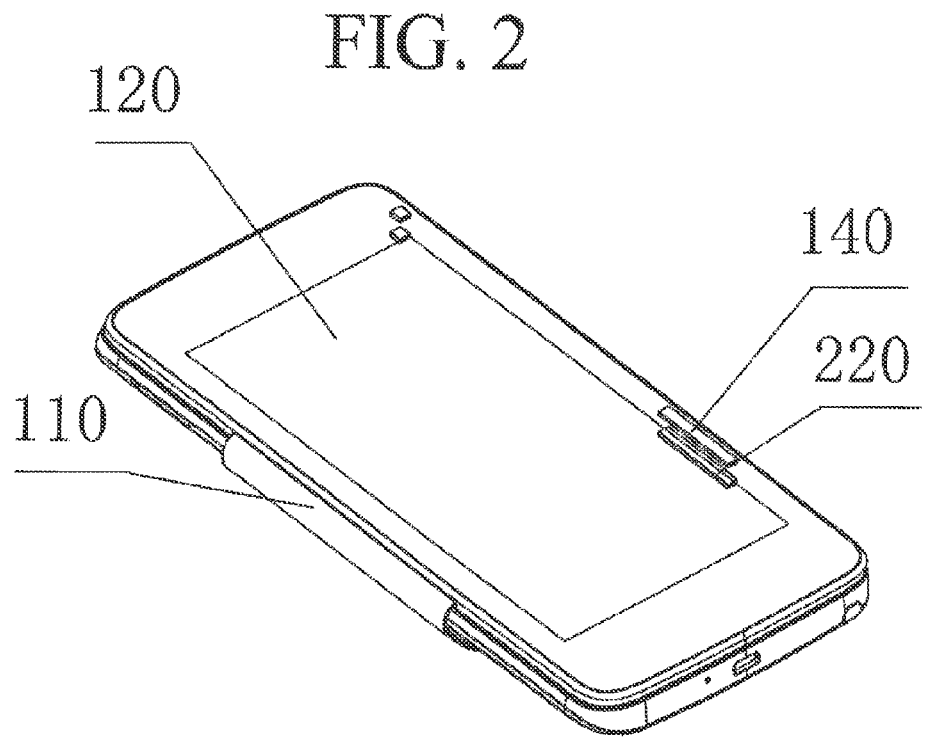
FIG. 2 is a schematic drawing illustrating a display protection cover of the intelligent terminal of the present invention after closing.

Furthermore, as shown in FIG. 2, a side of the display protection cover 100 separated from the terminal body 200 has a third magnet 140, and the terminal body 200 is provided with a fourth magnet 220 magnetically attracting the third magnet 140.

The terminal body 200 is coupled to the display protection cover 100 via the connecting portion, i.e, one side thereof being connected, the other side thereof being separated. That is, the third magnet 140 and the fourth magnet 220 are disposed on the side of the display protection cover 100 and the terminal body 200 separated from each other. Only when the cover is closed will the third magnet magnetic 140 and the fourth magnet 220 attract each other. Accordingly, the positioning manner of the terminal body 200 and the display protection cover 100 achieves the positioning in the X, Y directions at the same time, allowing users to open and close the cover very conveniently. Similarly, there can be two third magnets 140 disposed respectively at upper and lower ends of the side of the display protection cover 100 separated from the terminal body 200. Correspondingly, two fourth magnets 220 are also disposed at the corresponding positions on the terminal body 200, thereby making the display protection cover 100 more stable after closing.

Furthermore, the side of the terminal body has a locating hole. Correspondingly, the connecting portion 110 in the side of the display protection cover 100 has a locating column disposed thereon for inserting into the locating hole.

The action of the locating hole and the locating column makes the connecting portion 110 be accurately coupled to the terminal body 200. In order to achieve accurate positioning, there can be multiple locating holes disposed along the side of the terminal body 200. For example, the locating holes can be arranged in a row, and the spacing between the adjacent locating holes is the same. Obviously, the locating columns having a corresponding number are required to be disposed thereon, and the spacing between the adjacent locating columns is identical to the spacing between the adjacent locating holes. However, it is preferable to dispose two locating holes, and the spacing thereof is relatively long, whereby the positioning function can be achieved.

A structure of the connecting portion of the present invention will be illustrated in detail in the accompanying drawings in the following.

Figure 3:
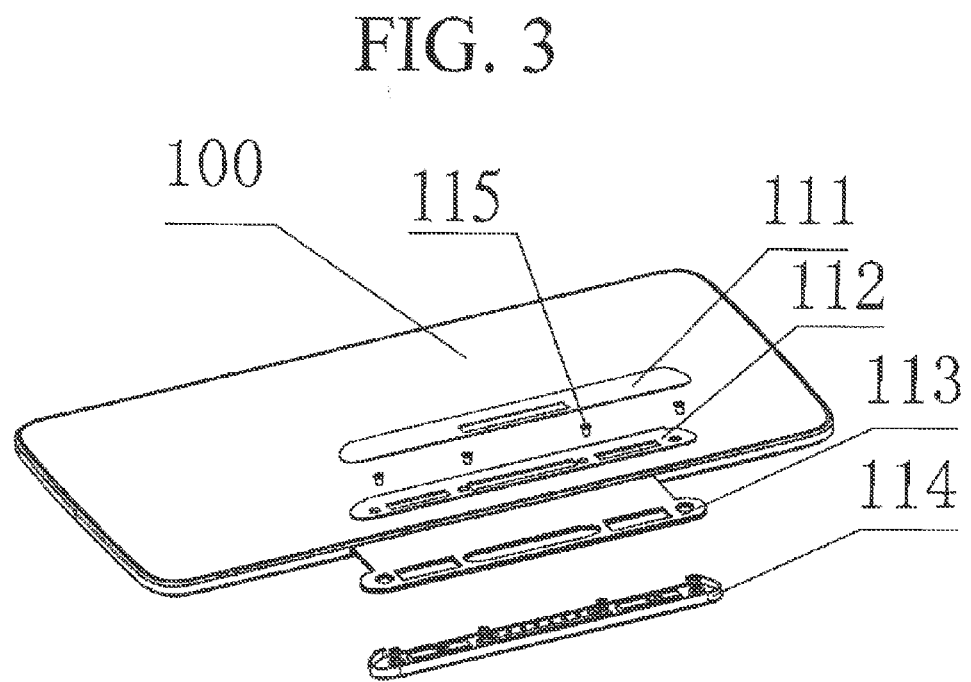
FIG. 3 is an exploded view illustrating a connecting portion of the intelligent terminal of the present invention.
Figure 4:
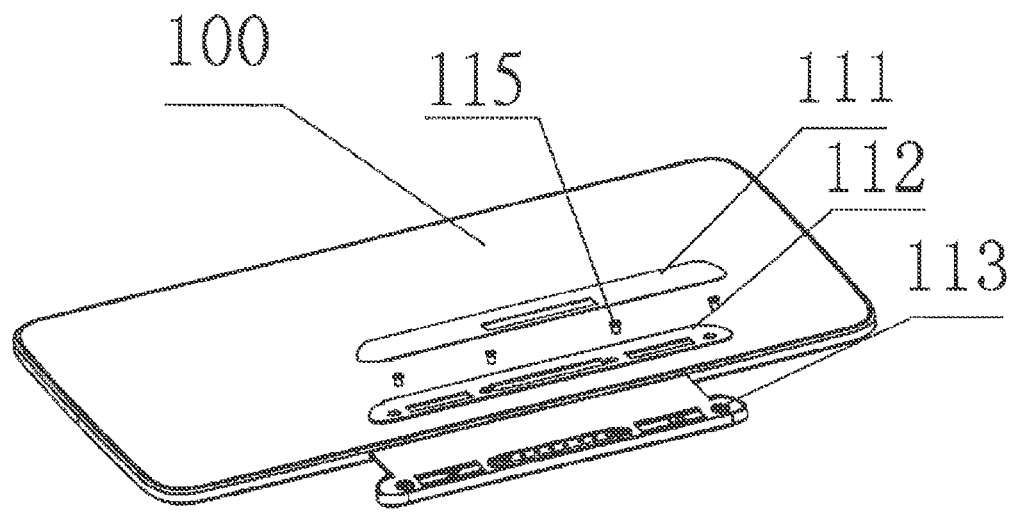
FIG. 4 to FIG. 7 are schematic drawings illustrating the assembly processes of the connecting portion of the intelligent terminal of the present invention.
Figure 5:
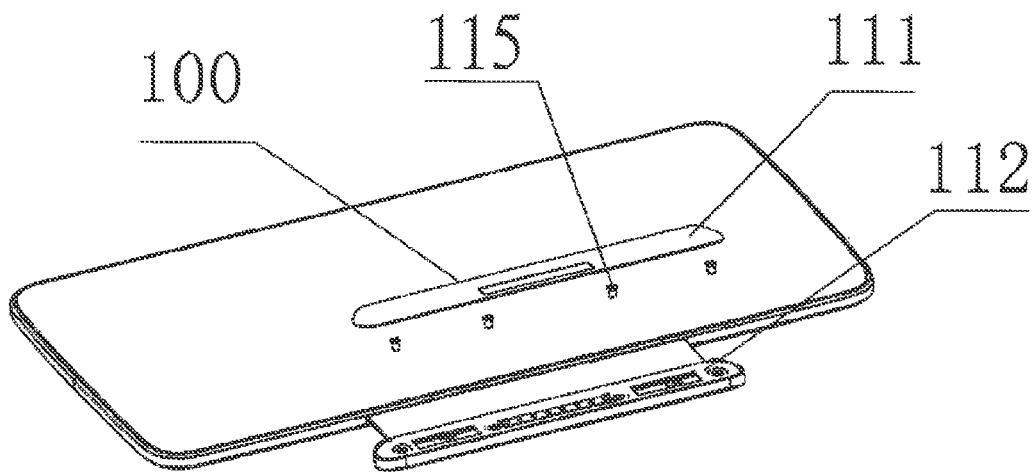
Figure 6:
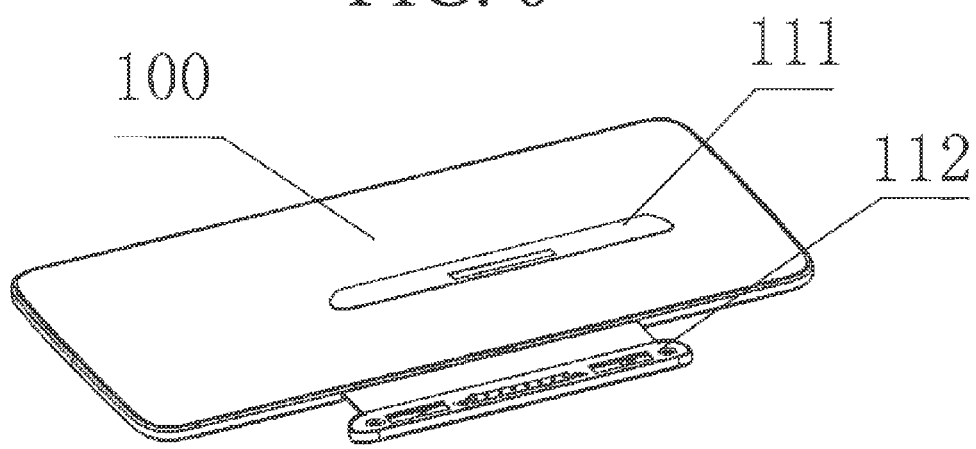
Figure 7:
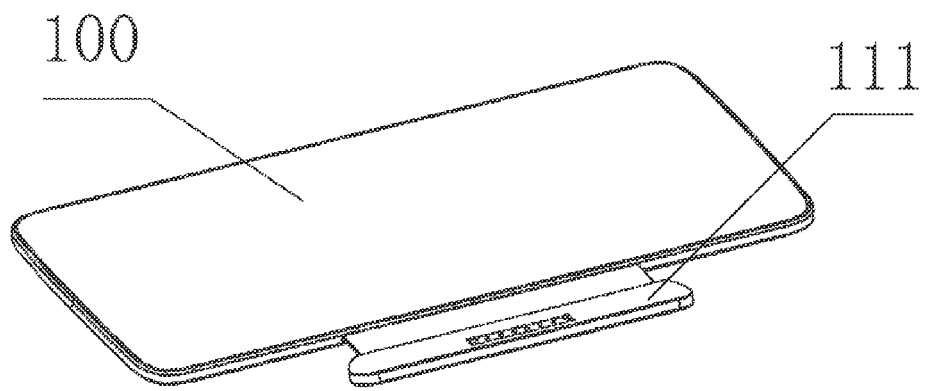

As shown in FIG. 3, the connecting portion 110 of the present invention includes a support 114, a leather portion 113, a metal press plate 112, and a lid 111. The leather portion 113 is coupled to the side of the display protection cover 100. The leather portion 113 is a main part of the connecting portion 110. Since it belongs to flexible materials and is capable of being rotated, the display protection cover 100 can carry out the opening and closing operations by the leather portion 113. The support 114 is disposed on a bottom of the leather portion 113, and the metal press plate 112 is disposed on a top of the leather portion 113. Moreover, the support 114, the leather portion 113, and the metal press plate 112 are fixed by screws, and the lid 111 is disposed on a top of the metal press plate 112. As shown in FIG. 3 to FIG. 7, the assembly processes is as follows: first, mounting the support 114 on the bottom of the leather portion 113, then mounting the metal press plate 112 on the top of the leather portion 113, then fixing the three by using first screws 115, and finally, covering the metal press plate 112 with the lid 111. The connecting manner of the lid 111 and the metal press plate 112 can be gluing, engaging, and so on.

Figure 8:
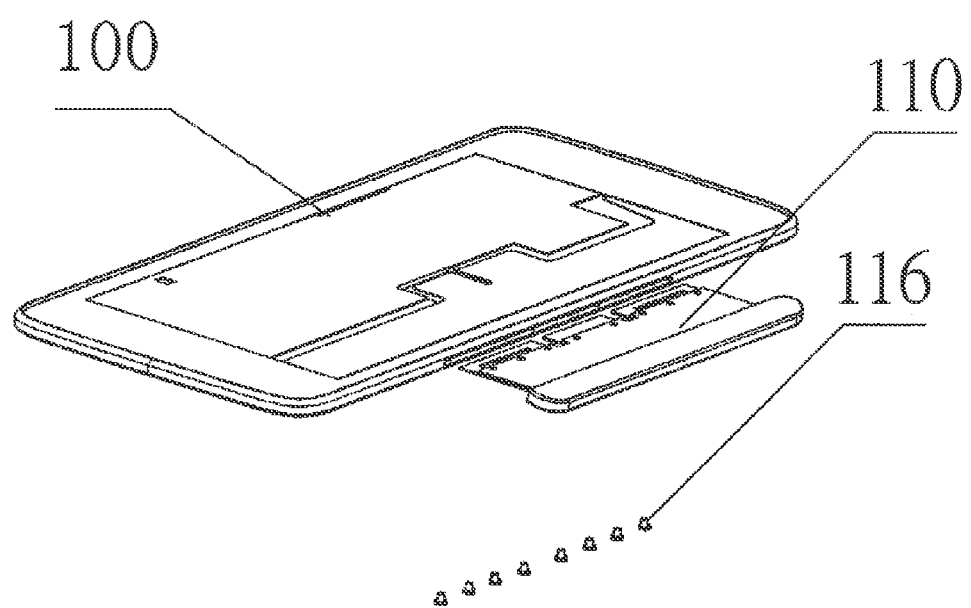
FIG. 8 is an exploded view illustrating the connecting portion and the display protection cover of the intelligent terminal of the present invention.
Figure 9:
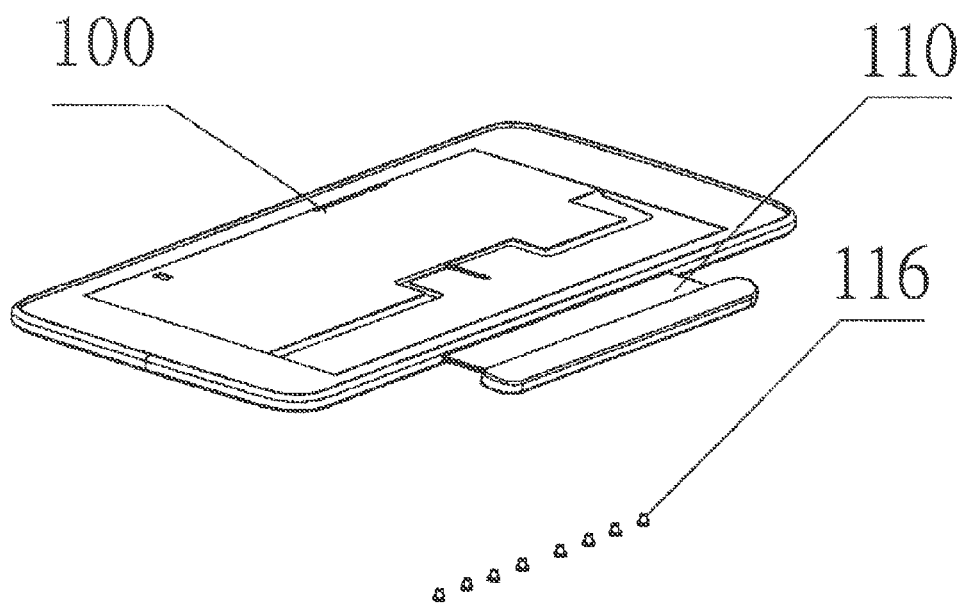
FIG. 9 to FIG. 10 are schematic drawings illustrating the assembly processes of the connecting portion and the display protection cover of the intelligent terminal of the present invention.
Figure 10:
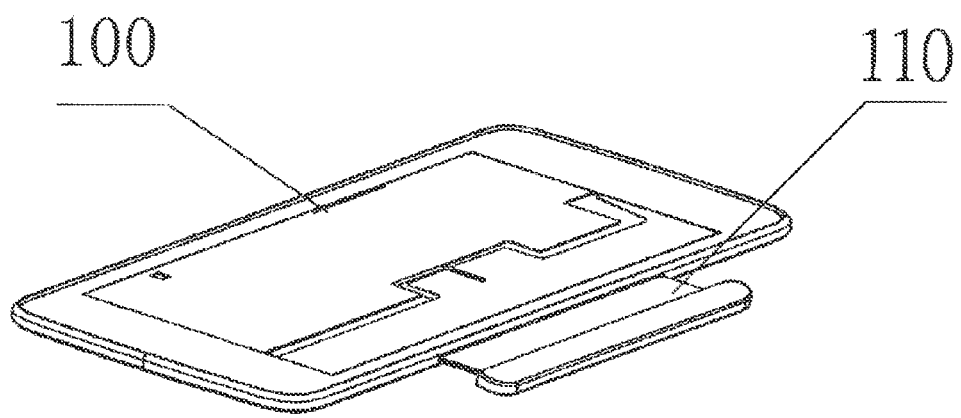

The above-mentioned structures of the connecting portion 110 are utilized to connect the terminal body 200, and the connecting manner of the connecting portion 110 and the display protection cover 100 is to fix by second screws 116, that is, to directly fix the connecting portion 110 on the side of the display protection cover 100 through the second screws 116. As shown in FIG. 8 to FIG. 10, the assembly processes is as follows: first, inserting the connecting portion 110 into an insertion slit of the display protection cover 100, and then fixing the connecting portion 110 and the display protection cover 100 through the second screws 116.

In the present invention, the electronic ink display screen 120 can be controlled via a volume button on the side of terminal body 200 after closing the display protection cover 100. Certainly, it can be controlled further via other buttons mounted on the side of the terminal body 200.

In summary, the electronic ink display screen is disposed on the display protection cover and uses the spring probe to perform the data communication, power supply and display with the terminal body in the present invention, whereby the present invention realizes the function of the E-Ink display on the mobile terminal. The most important feature of the present invention is that it has a slim and compact size and is easy to carry, so that the capability of the E-Ink display on a mobile terminal can be achieved in the user's own mobile phone or other mobile terminals.

It should be understood that the applications of the present disclosure are not limited to what is described above. Those of ordinary skill in the art may make modifications or variations according to the above description, and all of these modifications and variations are to be covered within the scope of the attached claims of the present disclosure.

What is claimed is:

1. An intelligent terminal with an electronic ink display device, comprising:
    a terminal body having a display screen; and
    a display protection cover utilized to protect the display screen of the terminal body;
    wherein a side of the display protection cover has a connecting portion which is movably coupled to a side of the terminal body, a front of the display protection cover has an electronic ink display screen disposed thereon, the electronic ink display screen performing data communication with the terminal body via a spring probe;
    wherein the connecting portion has a first magnet disposed thereon, and the terminal body is provided with a second magnet, and a position of the second magnet on the terminal body corresponds to a position of the first magnet on the connecting portion;
    wherein a side of the display protection cover separated from the terminal body has a third magnet, the terminal body is provided with a fourth magnet, and a position of the fourth magnet on the terminal body corresponds to a position of the third magnet on the display protection cover;
    wherein the terminal body has a volume button disposed on the side of the terminal body, the electronic ink display screen is controlled by the volume button after closing the display protection cover.

2. The intelligent terminal with the electronic display device according to claim 1, wherein the side of the terminal body has a locating hole, and the connecting portion has a locating column disposed thereon for inserting into the locating hole.

3. The intelligent terminal with the electronic display device according to claim 1, wherein the side of the terminal body has a plurality of locating holes disposed along the side of the terminal body.

4. The intelligent terminal with the electronic display device according to claim 1, wherein the connecting portion further comprises a support, a leather portion, a metal press plate, and a lid, the leather portion is coupled to the side of the display protection cover, the support is disposed on a bottom of the leather portion, the metal press plate is disposed on a top of the leather portion, the support, the leather portion, and the metal press plate are fixed by screws, the lid is disposed on a top of the metal press plate.

5. The intelligent terminal with the electronic display device according to claim 4, wherein the lid is engaged with the metal press plate.

6. The intelligent terminal with the electronic display device according to claim 4, wherein the lid is glued to the metal press plate.

7. The intelligent terminal with the electronic display device according to claim 1, wherein the connecting portion is fixed on the side of the display protection cover by screws.

8. An intelligent terminal with an electronic ink display device, comprising:
    a terminal body; and
    a display protection cover utilized to protect a display screen of the terminal body;
    wherein a side of the display protection cover is coupled to a side of the terminal body, a front of the display protection cover having an electronic ink display screen disposed thereon, the electronic ink display screen performing data communication with the terminal body via a spring probe;
    wherein the terminal body has a volume button disposed on the side of the terminal body, the electronic ink display screen is controlled by the volume button after closing the display protection cover.

9. The intelligent terminal with the electronic display device according to claim 8, wherein the side of the display protection cover has a connecting portion which is movably coupled to the terminal body.

10. The intelligent terminal with the electronic display device according to claim 9, wherein the connecting portion has a first magnet disposed thereon, and the terminal body is provided with a second magnet, and a position of the second magnet on the terminal body corresponds to a position of the first magnet on the connecting portion.

11. The intelligent terminal with the electronic display device according to claim 9, wherein a side of the display protection cover separated from the terminal body has a third magnet, the terminal body is provided with a fourth magnet, and a position of the fourth magnet on the terminal body corresponds to a position of the third magnet on the display protection cover.

12. The intelligent terminal with the electronic display device according to claim 9, wherein the side of the terminal body has a locating hole, and the connecting portion has a locating column disposed thereon for inserting into the locating hole.

13. The intelligent terminal with the electronic display device according to claim 9, wherein the side of the terminal body has a plurality of locating holes disposed along the side of the terminal body.

14. The intelligent terminal with the electronic display device according to claim 9, wherein the connecting portion further comprises a support, a leather portion, a metal press plate, and a lid, the leather portion is coupled to the side of the display protection cover, the support is disposed on a bottom of the leather portion, the metal press plate being is cm a top of the leather portion, the support, the leather portion, and the metal press plate are fixed by screws, the lid is disposed on a top of the metal press plate.

15. The intelligent terminal with the electronic display device according to claim 14, wherein the lid is engaged with the metal press plate.

16. The intelligent terminal with the electronic display device according to claim 14, wherein the lid is glued to the metal press plate.

17. The intelligent terminal with the electronic display device according to claim 9, wherein the connecting portion is fixed on the side of the display protection cover by screws.

* * * * *